US011946226B2

(12) United States Patent
Hoshino et al.

(10) Patent No.: US 11,946,226 B2
(45) Date of Patent: Apr. 2, 2024

(54) WORK MACHINE

(71) Applicant: Hitachi Construction Machinery Co., Ltd., Tokyo (JP)

(72) Inventors: Masatoshi Hoshino, Ibaraki (JP); Seiji Hijikata, Ibaraki (JP); Yasutaka Tsuruga, Ibaraki (JP); Ryou Yagisawa, Ibaraki (JP); Shou Furukawa, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/023,784

(22) PCT Filed: Dec. 17, 2021

(86) PCT No.: PCT/JP2021/046812
§ 371 (c)(1),
(2) Date: Feb. 28, 2023

(87) PCT Pub. No.: WO2022/201676
PCT Pub. Date: Sep. 29, 2022

(65) Prior Publication Data
US 2023/0323635 A1 Oct. 12, 2023

(30) Foreign Application Priority Data
Mar. 26, 2021 (JP) ................................ 2021-053087

(51) Int. Cl.
*E02F 9/22* (2006.01)
*F15B 11/16* (2006.01)

(52) U.S. Cl.
CPC .......... *E02F 9/2235* (2013.01); *E02F 9/2246* (2013.01); *E02F 9/2296* (2013.01); *F15B 11/165* (2013.01); *F15B 2211/2658* (2013.01); *F15B 2211/275* (2013.01); *F15B 2211/633* (2013.01); *F15B 2211/6651* (2013.01); *F15B 2211/6652* (2013.01)

(58) Field of Classification Search
CPC .................. F15B 11/161; F15B 11/165; F15B 2211/2658; F15B 2211/275;
(Continued)

(56) References Cited

U.S. PATENT DOCUMENTS 4,697,418 A * 10/1987 Okabe .................. E02F 9/2296 60/434
4,726,186 A * 2/1988 Tatsumi ................ E02F 9/2285 60/434
(Continued)

FOREIGN PATENT DOCUMENTS

JP 4-27784 A 1/1992
JP 2007-120426 A 5/2007
(Continued)

OTHER PUBLICATIONS

International Search Report (PCT/ISA/210) issued in PCT Application No. PCT/JP2021/046812 dated Mar. 8, 2022 with English translation (four (4) pages).
(Continued)

*Primary Examiner* — Michael Leslie
(74) *Attorney, Agent, or Firm* — Crowell & Moring LLP

(57) ABSTRACT

Provided is a work machine capable of achieving both low fuel consumption and ensuring of workability. The work machine is configured to, in a state where an output of an engine or hydraulic pump has increased to an increase threshold (S12: Yes) with the rotational speed being at a first rotational speed (S11: Yes), raise the rotational speed from the first rotational speed to a second rotational speed (S13); in a process of raising the rotational speed to the second rotational speed, output, to a regulator, a signal instructing reduction in the discharge rate (S14) so as to keep the output of the engine or hydraulic pump constant; and after the rotational speed has reached the second rotational speed, output, to the regulator, a signal instructing increase in the discharge rate (S16) so as to make the output of the engine or hydraulic pump have a value corresponding to a request load.

3 Claims, 8 Drawing Sheets

(58) Field of Classification Search
CPC ........ F15B 2211/633; F15B 2211/6651; E02F 9/2203; E02F 9/2232; E02F 9/2235; E02F 9/2246; E02F 9/226
See application file for complete search history.

(56) References Cited

U.S. PATENT DOCUMENTS

| | | | | |
|---|---|---|---|---|
| 6,321,535 | B2 * | 11/2001 | Ikari | B62D 5/065 60/449 |
| 8,725,364 | B2 * | 5/2014 | Ishibashi | F16H 61/421 701/55 |
| 10,364,550 | B2 * | 7/2019 | Amano | E02F 9/2292 |
| 10,408,236 | B2 * | 9/2019 | Knobloch | E02F 9/2296 |
| 11,447,930 | B2 * | 9/2022 | Young | F15B 11/055 |
| 2009/0320461 | A1 | 12/2009 | Morinaga et al. | |

FOREIGN PATENT DOCUMENTS

| | | | |
|---|---|---|---|
| JP | 2008-196673 | A | 8/2008 |
| JP | 2020-076221 | A | 5/2020 |

OTHER PUBLICATIONS

Japanese-language Written Opinion (PCT/ISA/237) issued in PCT Application No. PCT/JP2021/046812 dated Mar. 8, 2022 (three (3) pages).

* cited by examiner

WORK MACHINE

TECHNICAL FIELD

The present invention relates to a work machine equipped with a variable displacement hydraulic pump.

BACKGROUND ART

Conventionally, a work machine equipped with an engine, a variable displacement hydraulic pump that discharges hydraulic oil by using a driving force of the engine, a regulator that varies the discharge rate of the hydraulic pump, and a hydraulic actuator that works by using the hydraulic oil discharged from the hydraulic pump has been known.

In the work machines as described above, there has been known a technique of, for making the hydraulic actuator work at low load, reducing the rotational speed of the engine and driving the engine with high torque while, for making the hydraulic actuator work at high load, increasing the rotational speed of the engine enables both improvement in fuel efficiency and high power to be achieved (for example, see Patent Literature 1).

CITATION LIST

Patent Literature

Patent Literature 1: JP-A-2007-120426

SUMMARY OF INVENTION

Technical Problem

Here, in order to raise the rotational speed of the engine for the high load, it is necessary to provide not only the torque for an increased load but also the torque transiently necessary for the inertial force of the rotating bodies (engine and hydraulic pump). With this regard, the technique according to Patent Literature 1 has a problem that raising the rotational speed of the engine takes time, and thus results in reduction in workability.

The present invention has been made in view of the circumstances above, and an object of the present invention is to provide a technique for achieving both low fuel consumption and ensuring of workability of a work machine that allows the rotational speed of an engine to be switched in accordance with load of a hydraulic actuator.

Solution to Problem

In order to achieve the object described above, the present invention provides a work machine comprising: an engine; a variable displacement hydraulic pump that discharges a hydraulic oil by using a driving force of the engine; a regulator that varies a discharge rate of the hydraulic pump; a hydraulic actuator that works by using the hydraulic oil discharged from the hydraulic pump; a rotational speed sensor that detects a rotational speed of the engine; and a controller that controls the rotational speed of the engine and the discharge rate of the hydraulic pump, wherein the controller is configured to: in a state where an power of the engine or an output of the hydraulic pump has increased to an increase threshold with the rotational speed detected by the rotational speed sensor being at a first rotational speed, raise the rotational speed of the engine from the first rotational speed to a second rotational speed that is higher than the first rotational speed; in a process of raising the rotational speed of the engine to the second rotational speed, output, to the regulator, a signal instructing reduction in the discharge rate of the hydraulic pump so as to keep the power of the engine or the output of the hydraulic pump constant; and after the rotational speed detected by the rotational speed sensor has reached the second rotational speed, output, to the regulator, a signal instructing increase in the discharge rate of the hydraulic pump so as to make the power of the engine or the output of the hydraulic pump have a value corresponding to a request load.

Advantageous Effects of Invention

According to the present invention, it is possible to achieve both low fuel consumption and ensuring of workability of a work machine that allows the rotational speed of an engine to be switched in accordance with load of a hydraulic actuator. The problems, configurations, and advantageous effects other than those described above will be clarified by explanation of an embodiment below.

DESCRIPTION OF EMBODIMENTS

An embodiment of a hydraulic excavator 1 (work machine) according to the present invention will be described with reference to the drawings. A specific example of the work machine is not limited to the hydraulic excavator 1, and the work machine may be a wheel loader, a crane, a dump truck, or the like. Note that the front, rear, left, and right referred in the present specification is based on the viewpoint of an operator who gets on and operates the hydraulic excavator 1 unless otherwise specified.

Figure 1:
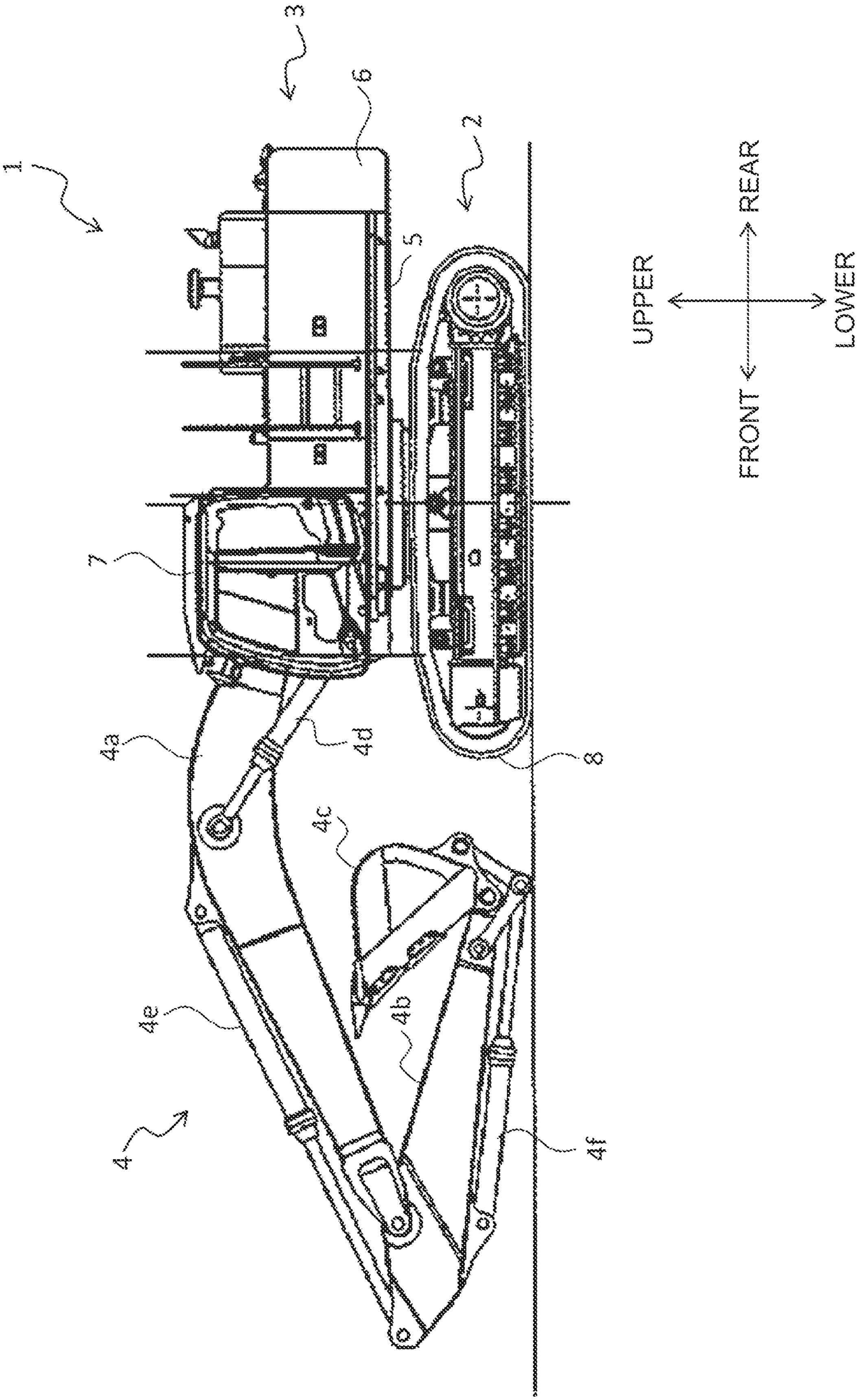
FIG. 1 is a side view of a hydraulic excavator.

FIG. 1 is a side view of the hydraulic excavator 1. As illustrated in FIG. 1, the hydraulic excavator 1 includes an undercarriage 2 and an upperstructure 3 supported by the undercarriage 2. A combination of the undercarriage 2 and upperstructure 3 are an example of a vehicle body.

The undercarriage 2 includes a pair of left and right crawlers 8 that are endless track bands. The pair of left and right crawlers 8 are driven by the traveling motor (not illustrated) and rotate independently. This allows the hydraulic excavator 1 to travel. Note that the undercarriage 2 may be a wheeled undercarriage without the crawler 8.

The upperstructure 3 is supported by the undercarriage 2 so as to allow a swing motor (not illustrated) to make the upperstructure 3 swing. The upperstructure 3 mainly includes a swing frame 5 serving as a base, a front working device 4 (working device) attached to the center of the front of the swing frame 5 so as rotationally move in the up and down direction, a cab (driver's seat) 7 disposed at the left side of the front of the swing frame 5, and a counterweight 6 disposed at the rear side of the swing frame 5.

The front working device 4 includes a boom 4*a* supported by the upperstructure 3 so as to be able to move up and down, an arm 4*b* supported by the distal end of the boom 4*a* so as to be able to rotationally move, a bucket 4*c* supported by the distal end of the arm 4*b* so as to be able to rotationally move, a boom cylinder 4*d* for driving the boom 4*a*, an arm cylinder 4*e* for driving the arm 4*b*, and a bucket cylinder 4*f* for driving the bucket 4*c*. The counterweight 6 is provided to balance the weight with the front working device 4, and is a heavy object having an arc shape in a top view.

The cab 7 is provided with an internal space allowing an operator of the hydraulic excavator 1 to get on. In the internal space of the cab 7, a seat on which an operator is to sit and an operation device to be operated by the operator sitting on the seat are arranged.

The operation device receives an operation provided by the operator for causing the hydraulic excavator 1 to work. The operator operates the operation device, thereby causing the undercarriage 2 to travel, the upperstructure 3 to swing, and the front working device 4 to work. Specifically, for example, the operation device includes a lever, a steering wheel, an accelerator pedal, a brake pedal, and a switch. In addition, the operation device includes, for example, a boom operation lever 7*a* (see FIG. 2) for operating the boom cylinder 4*d* and a mode selection switch 7*b* (see FIG. 3) for switching an operation mode of the hydraulic excavator 1.

The operator operates (pulls) the boom operation lever 7*a* to cause the boom cylinder 4*d* to extend and contract. More specifically, the larger the operation amount of the boom operation lever 7*a* is, the more the boom cylinder 4*d* extends and contracts. Although not illustrated in the drawings, the operation device further includes operation units (pedal, lever) for operating each of the traveling motor, the swing motor, the arm cylinder 4*e*, and the bucket cylinder.

The mode selection switch 7*b* allows the operator to select the operation mode of the hydraulic excavator 1 from among an eco mode, a power mode, and a high-power mode. The mode selection switch 7*b* outputs a mode signal indicating the operation mode selected by the operator to a vehicle body controller 21 (see FIG. 3).

The eco mode is an operation mode focusing on the low fuel consumption the most of the three operation modes. The high-power mode is an operation mode focusing on the high power the most of the three operation modes. The power mode is an operation mode intermediate between the eco mode and the power mode. That is, the eco mode, the power mode, and the high-power mode are more fuel efficient in this order, and the high-power mode, the power mode, and the eco mode have higher power in this order. Where the high-power mode is the first mode, the power mode and the eco mode are the second modes. Where the power mode is the first mode, the eco mode is the second mode.

Figure 2:
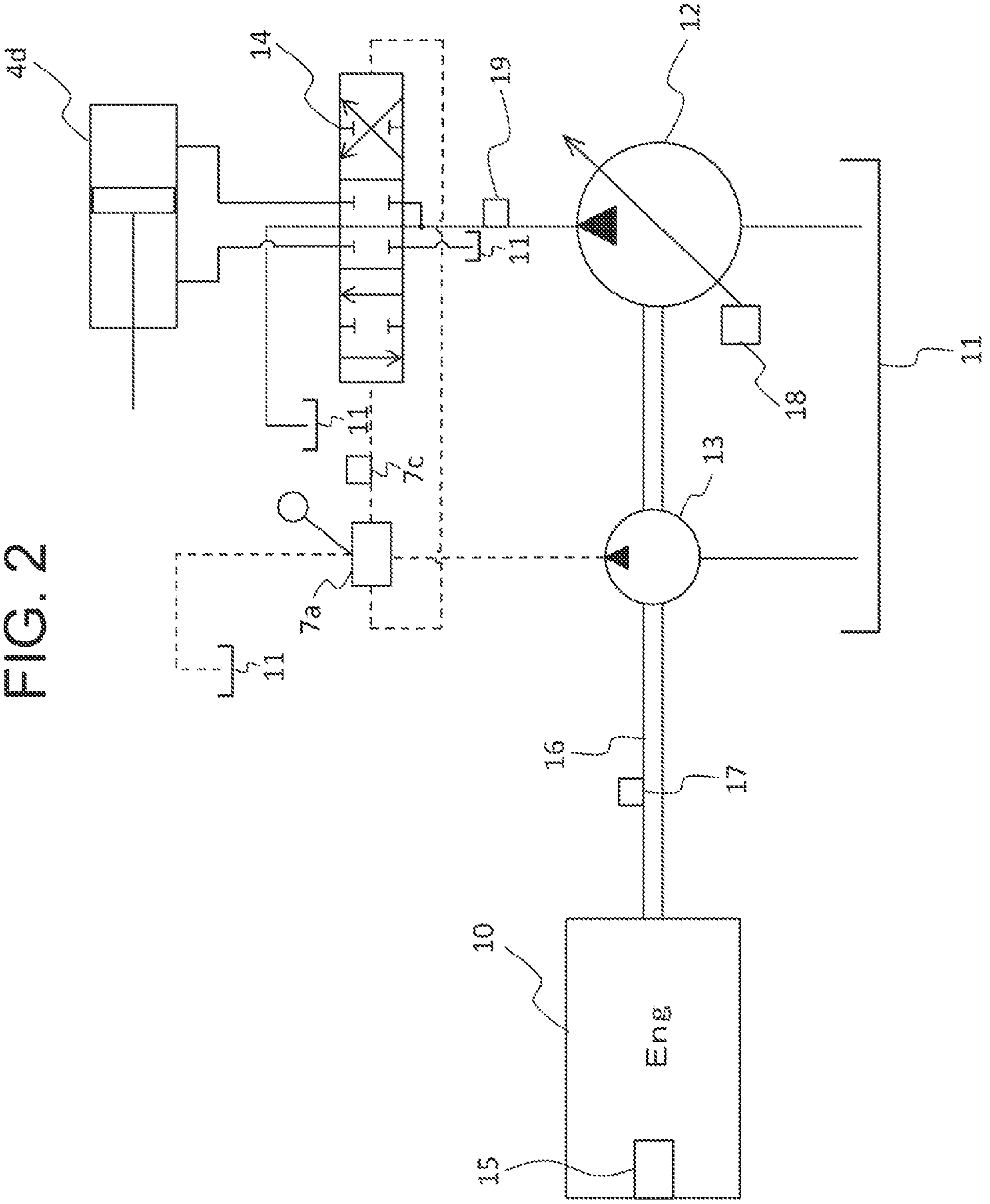
FIG. 2 illustrates a drive circuit of a hydraulic excavator.

FIG. 2 illustrates a drive circuit of the hydraulic excavator 1. As illustrated in FIG. 2, the hydraulic excavator 1 mainly includes an engine 10, a hydraulic oil tank 11, a hydraulic pump 12, a pilot pump 13, and a directional control valve 14.

The engine 10 generates a driving force for driving the hydraulic excavator 1. More specifically, the engine 10 mixes the air taken from the outside of the hydraulic excavator 1 and the fuel injected from an injector 15, and burns it to cause an output shaft 16 to rotate. The rotational speed (rpm) of the engine 10 is detected by a rotational speed sensor 17. The rotational speed sensor 17 outputs a rotational speed signal indicating the detected rotational speed to an engine controller 22 (see FIG. 3).

The hydraulic oil tank 11 stores the hydraulic oil. The hydraulic pump 12 and the pilot pump 13 are connected to the output shaft 16 of the engine 10. The hydraulic pump 12 and the pilot pump 13 discharge the hydraulic oil stored in the hydraulic oil tank 11 by using the driving force of the engine 10.

In order to simplify, FIG. 2 illustrates only the boom cylinder 4*d* among the hydraulic actuators. The directional control valve 14 is provided between the hydraulic pump 12 and the boom cylinder 4*d*. The hydraulic pump 12, the boom cylinder 4*d*, and the directional control valve 14 are connected to each other via pipes. In the neutral position of the boom operation lever 7*a*, the hydraulic pump 12 is connected, via the directional control valve 14, to the hydraulic oil tank 11 through the pipe. The hydraulic pump 12 supplies the hydraulic oil stored in the hydraulic oil tank 11 to the hydraulic actuators (travel motor, swing motor, boom cylinder 4*d*, arm cylinder 4*e*, and bucket cylinder 4*f*) through the directional control valve 14. The hydraulic pump 12 is a variable displacement (swash plate type or swash shaft type) pump whose discharge rate can be varied. The discharge rate of the hydraulic pump 12 is adjusted by a regulator 18 that works in accordance with a signal output from the vehicle body controller 21. The discharge pressure of the hydraulic pump 12 is detected by a discharge pressure sensor 19. The discharge pressure sensor 19 outputs a discharge pressure signal indicating the detected discharge pressure to the vehicle body controller 21.

A boom operation lever 7*a* is provided between the pilot pump 13 and the directional control valve 14. The pilot pump 13, the directional control valve 14, and the boom operation lever 7*a* are connected to each other via pilot pipes. In the neutral state of the boom operation lever 7*a*, the pilot pump 13 is connected, via the boom operation lever 7*a*, to the hydraulic oil tank 11 through the pilot pipe. The pilot pump 13 supplies the hydraulic oil stored in the hydraulic oil tank 11 to a pair of pilot ports of the directional control valve 14 through the boom operation lever 7*a*. The operator operates (pulls) the boom operation lever 7*a* toward one side, thereby causing the pilot pressure to act on one of the pair of pilot ports. On the other hand, the operator operates the boom operation lever 7*a* (pulls) toward the other side, thereby causing the pilot pressure to act on the other one of the pair of pilot ports.

The pilot pressure acting on the pilot port increases as the operation amount of the boom operation lever 7*a* increases. The pilot pressure acting on the pilot port is detected by a pilot pressure sensor 7*c*. The pilot pressure sensor 7*c* outputs a pilot pressure signal indicating the detected pilot pressure to the vehicle body controller 21.

The directional control valve 14 supplies the hydraulic oil discharged from the hydraulic pump 12 to a bottom chamber or rod chamber of the boom cylinder 4*d*. Furthermore, the directional control valve 14 controls the direction and amount of the hydraulic oil to be supplied to the boom cylinder 4*d* in accordance with the pilot pressure acting on the pilot port.

More specifically, the pilot pressure acting on one of the pilot ports causes the directional control valve 14 to supply the hydraulic oil to the bottom chamber of the boom cylinder 4*d* while flowing back the hydraulic oil in the rod chamber to the hydraulic oil tank 11. This causes the boom cylinder 4*d* to extend. On the other hand, the pilot pressure acting on the other pilot port causes the directional control valve 14 to supply the hydraulic oil to the rod chamber of the boom cylinder 4*d* while flowing back the hydraulic oil in the bottom chamber to the hydraulic oil tank 11. This causes the boom cylinder 4*d* to contract. The directional control valve 14 increases the amount of the hydraulic oil to be supplied to the boom cylinder 4*d* as the pilot pressure acting on the pilot port increases.

Figure 3:
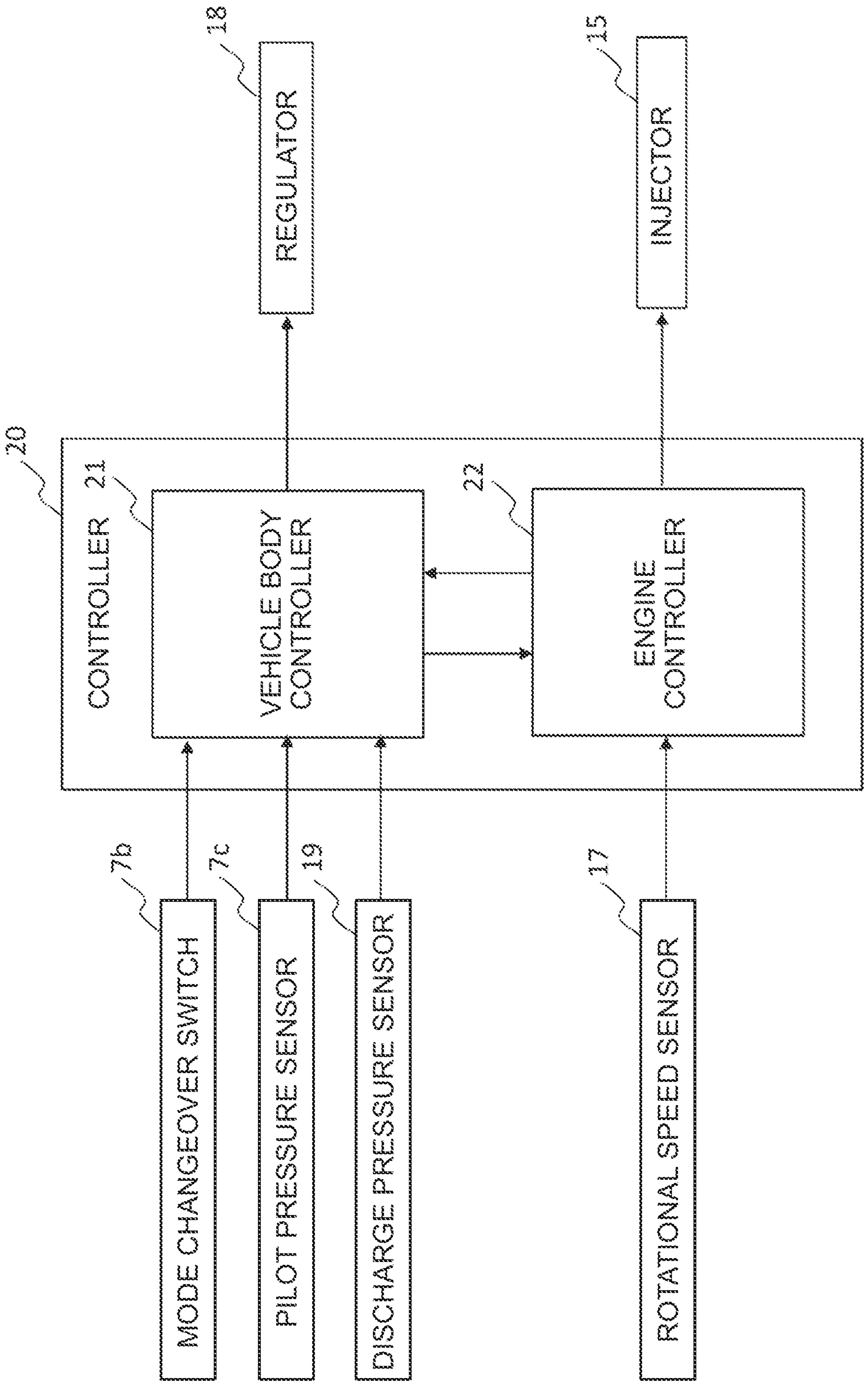
FIG. 3 is a hardware configuration diagram of a hydraulic excavator.

FIG. 3 is a hardware configuration diagram of the hydraulic excavator 1. As illustrated in FIG. 3, the hydraulic excavator 1 includes the vehicle body controller 21 for controlling the whole of the hydraulic excavator 1, and an engine controller 22 for controlling the operations of the engine 10. Note that the functions of the vehicle body controller 21 and engine controller 22 to be described below are exemplarily distributed therebetween, however, the vehicle body controller 21 and the engine controller 22 may be collectively referred to as a "controller 20" herein.

The vehicle body controller 21 acquires the mode signal output from the mode selection switch 7*b*, the pilot pressure signal output from the pilot pressure sensor 7*c*, the discharge pressure signal output from the discharge pressure sensor 19, and the rotational speed signal output from the engine controller 22. Then, the vehicle body controller 21 outputs, to the regulator 18, a signal instructing adjustment (increase or decrease) of the discharge rate of the hydraulic pump 12, and notifies the engine controller 22 of the target rotational speed of the engine 10.

The engine controller 22 acquires the rotational speed signal output from the rotational speed sensor 17, and acquires the target rotational speed of the engine 10 from the vehicle body controller 21. Then, the engine controller 22 outputs the rotational speed signal acquired from the rotational speed sensor 17 to the vehicle body controller 21, and controls the injection of the fuel by the injector 15 based on the target rotational speed acquired from the vehicle body controller 21.

The controller 20 includes a CPU (Central Processing Unit), a ROM (Read Only Memory), and a RAM (Random Access Memory). The CPU reads the program codes stored in the ROM and executes them, thereby causing the controller 20 to implement the processing which will be described later. The RAM is used as a work area for execution of the programs by the CPU. The ROM and RAM are examples of memories.

The specific configuration of the controller 20 is not limited thereto, and may be implemented by hardware such as ASIC (Application Specific Integrated Circuit) or FPGA (Field-Programmable Gate Array).

Figure 4:
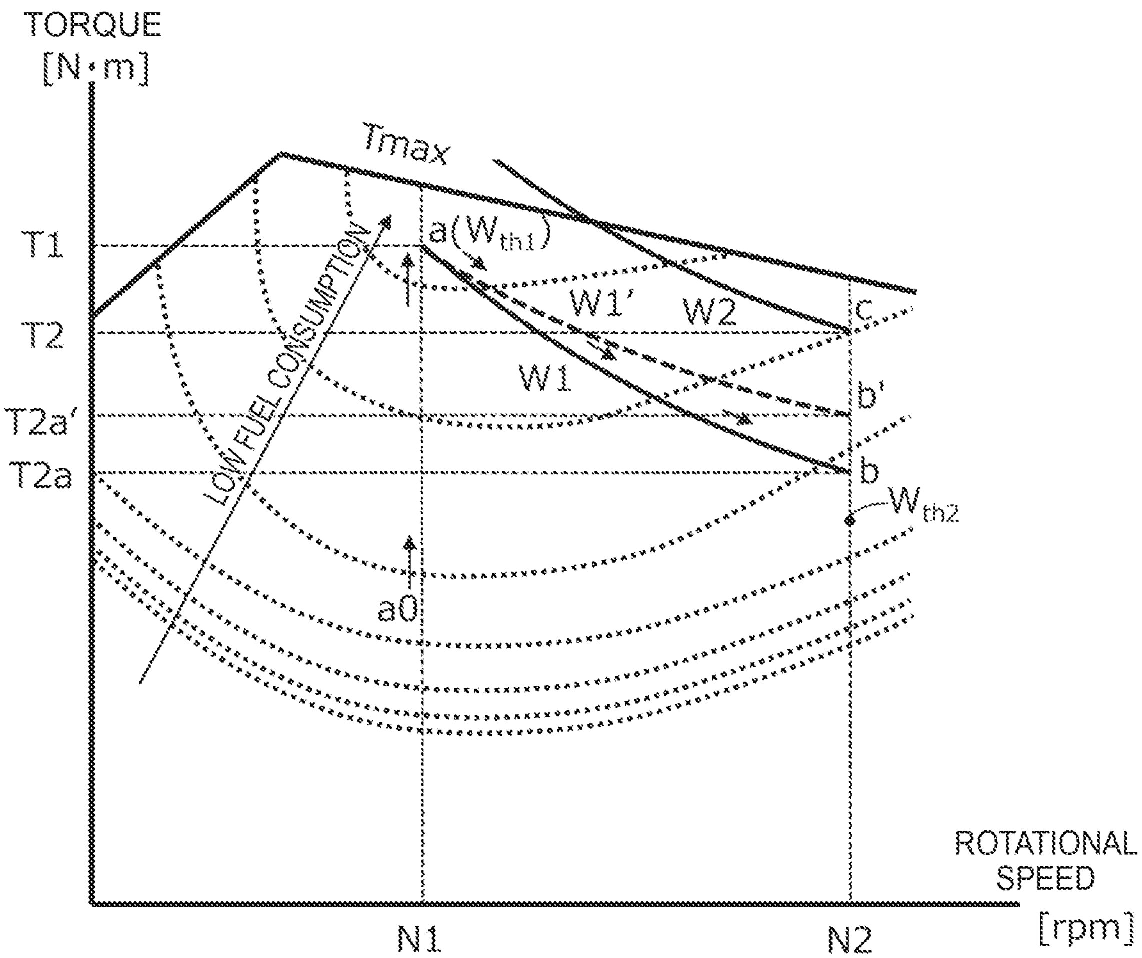
FIG. 4 illustrates a relation between engine rotational speed and engine torque.

FIG. 4 illustrates a relation between the rotational speed and torque of the engine 10. The maximum torque Tmax of the engine 10 illustrated by the solid line in FIG. 4 varies depending on the rotational speed. More specifically, in an area with less rotational speed, the maximum torque Tmax gradually increases as the rotational speed increases. On the other hand, after having reached the maximum point, the maximum torque Tmax gradually decreases as the rotational speed increases.

The dotted lines illustrated in FIG. 4 represent equivalent fuel consumption rate lines with points having the equal fuel consumption rate of the engine 10 being connected. The fuel consumption rate is an indicator (g/kWh) indicating the fuel consumption for an hour per unit power (output) of the engine 10. That is, the less the value of the fuel consumption rate is, the better the fuel efficiency is. In the case of the engine 10 according to the present embodiment, at each rotational speed, the fuel efficiency tends to increase as the torque increases.

Therefore, the controller 20 according to the present embodiment drives the engine 10 at one of a first rotational speed N1 and a second rotational speed N2. The first rotational speed N1 enables the engine 10 to work with fuel consumption less than that of the second rotational speed N2. The first rotational speed N1 is set to, for example, a value more than that of the rotational speed corresponding to the maximum point of the maximum torque Tmax. On the other hand, the second rotational speed N2 enables the engine 10 to generate power W more than the first rotational speed N1. The second rotational speed N2 has a value more than that of the first rotational speed N1. The second rotational speed N2 is set to, for example, the rated rotational speed of the engine 10.

That is, the controller 20 may set the target rotational speed of the engine 10 at the first rotational speed N1 while the hydraulic actuators are working at low load, so as to cause the hydraulic excavator 1 to work with low fuel consumption. On the other hand, in the event of increase in the load of the hydraulic actuators, the controller 20 may increase the target rotational speed of the engine 10 from the first rotational speed N1 to the second rotational speed N2, so as to generate high power.

FIG. 4 also illustrates curved lines W1, W2 which are equivalent power lines with points having equivalent power of the engine 10 being connected. A second power value W2 is set more than the first power value W1. Thus, in order to keep the power of the engine 10 constant, it is necessary to reduce the torque of the engine 10 as the rotational speed of the engine 10 increases. On the other hand, a curved line W1' is an power line showing gradual increase in the power of the engine 10 according to increase in the rotational speed. The curved lines W1, W1', W2 are stored in the memories as the functions of the rotational speed and torque.

The torque of the engine 10 can be controlled by, for example, the discharge rate of the hydraulic pump 12. More specifically, causing the discharge rate of the hydraulic pump 12 to increase causes the torque of the engine 10 to increase as well. On the other hand, causing the discharge rate of the hydraulic pump 12 to decrease causes the torque of the engine 10 to decrease as well. That is, the controller 20 outputs, for causing the rotational speed of the engine 10 to increase, a signal instructing reduction in the discharge rate of the hydraulic pump 12 to the regulator 18, thereby allowing the rotational speed to be switched while keeping the power of the engine 10 constant.

Figure 5:
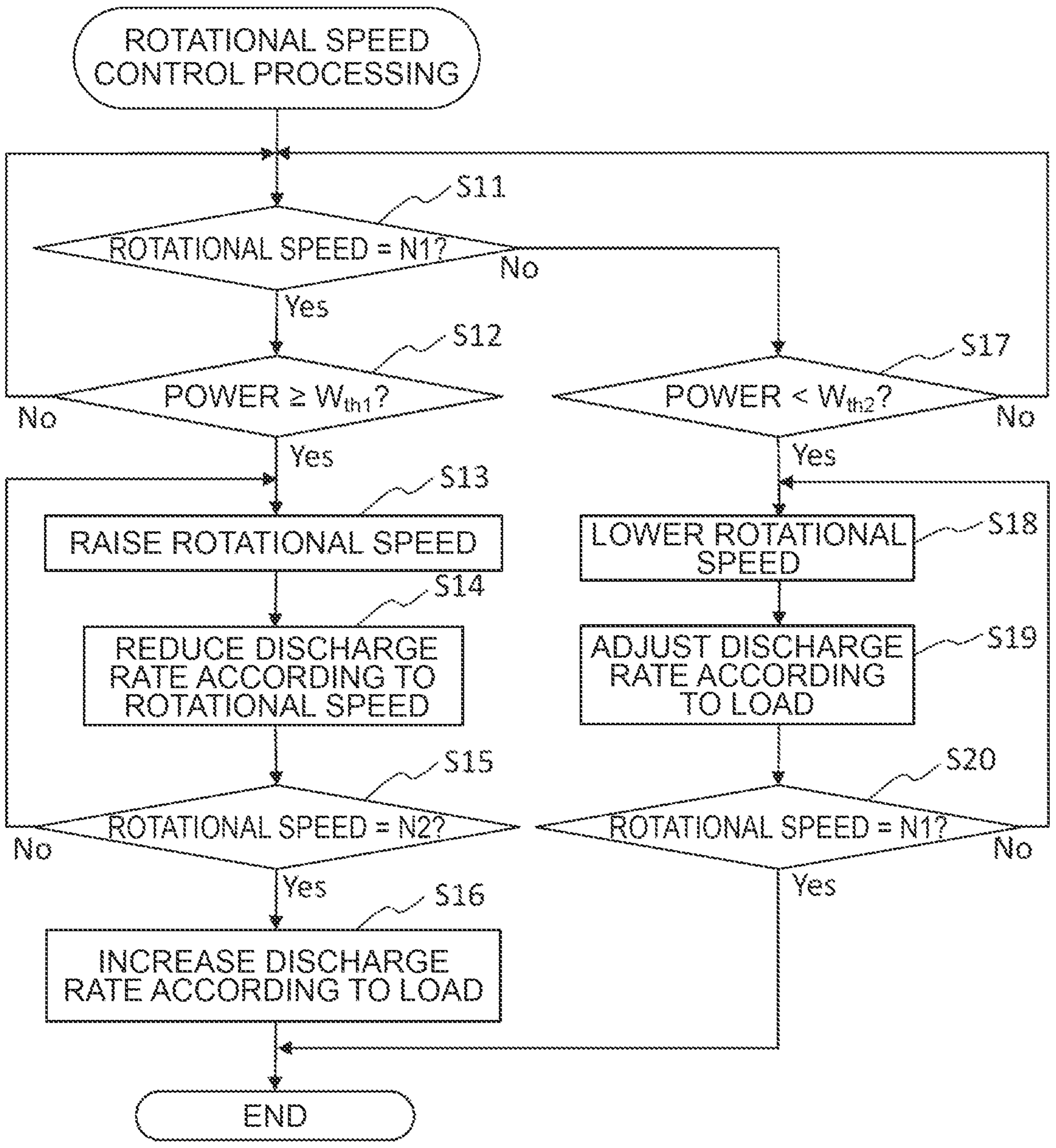
FIG. 5 illustrates a flowchart of rotational speed control processing.
Figure 6A:
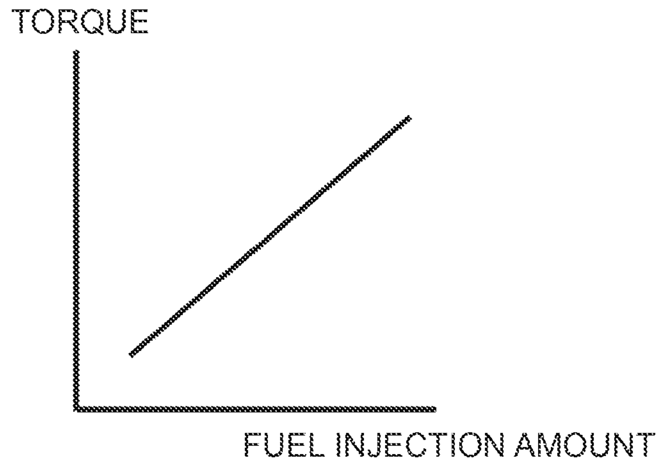
FIG. 6A illustrates a relation between an amount of fuel injection and engine torque.
Figure 6B:
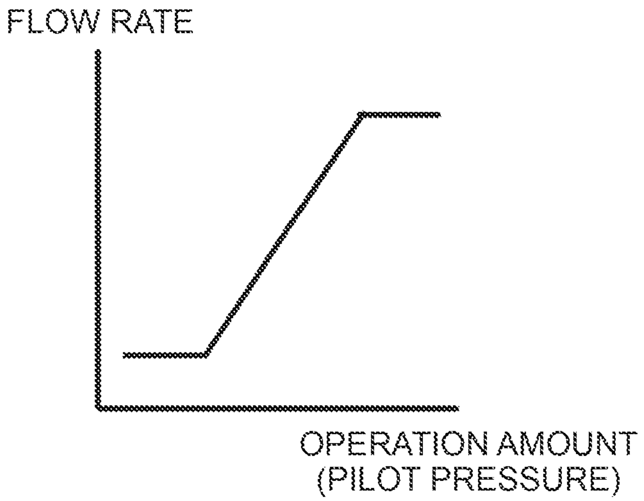
FIG. 6B illustrates a relation between an operation amount of a boom operation lever and a flow rate of a pump.
Figure 6C:
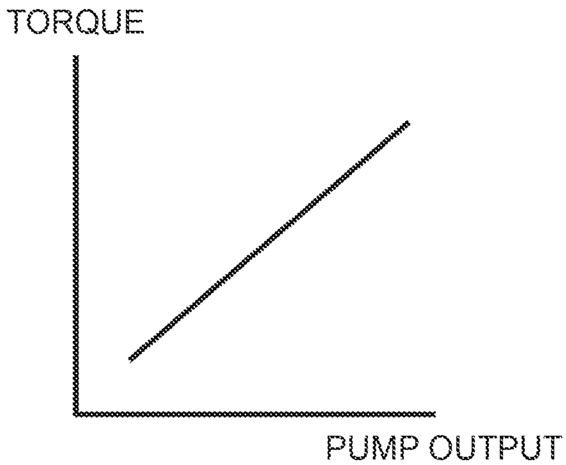
FIG. 6C illustrates a relation between output of a pump and engine torque.
Figure 7A:
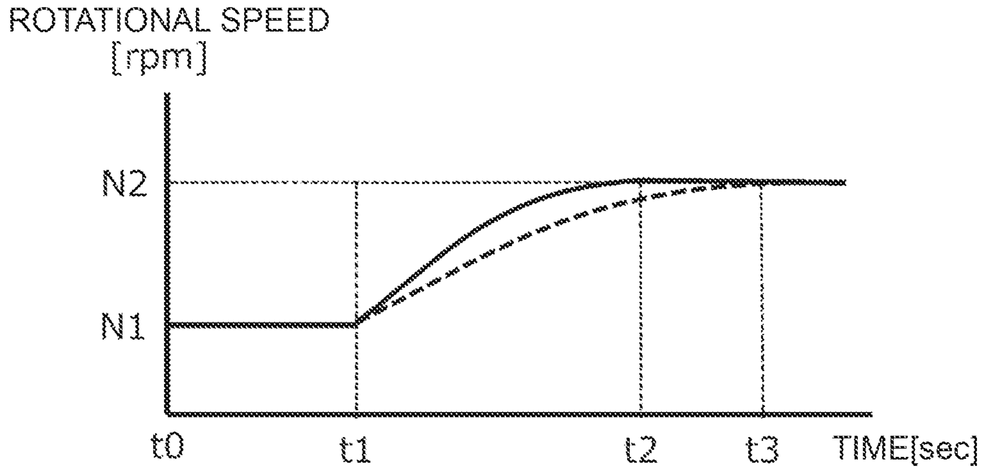
FIG. 7A illustrates temporal change in engine rotational speed in the rotational speed control processing.
Figure 7B:
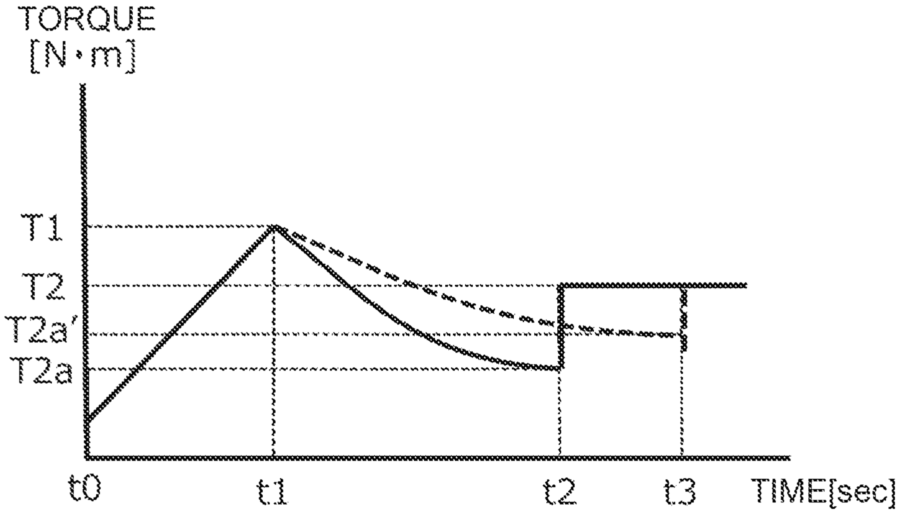
FIG. 7B illustrates temporal change in the engine torque in the rotational speed control processing.
Figure 7C:
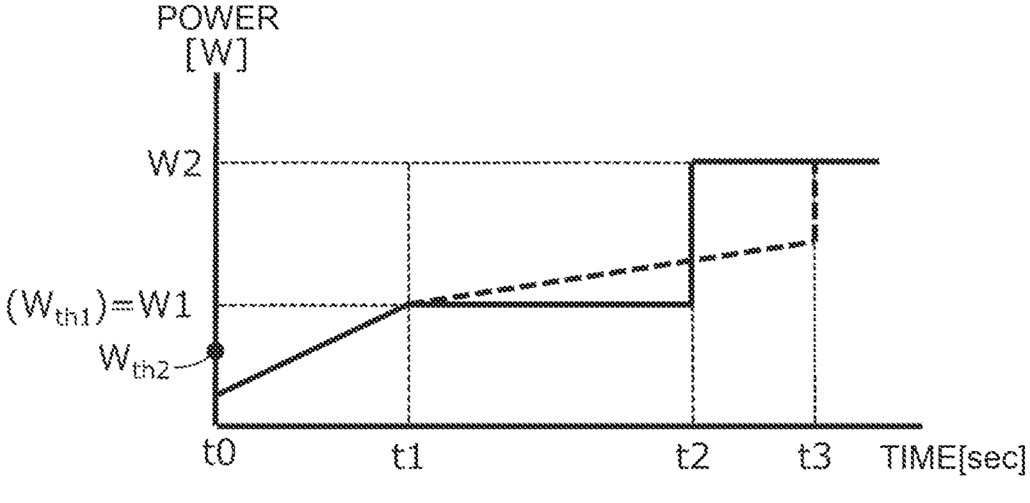
FIG. 7C illustrates temporal change in the engine power in the rotational speed control processing.

Next, with reference to FIG. 5 to FIG. 7C, the processing of controlling the rotational speed of the engine 10 and discharge rate of the hydraulic pump 12 will be described. FIG. 5 illustrates a flowchart of the rotational speed control processing. FIG. 6A to FIG. 6C are diagrams for explaining how to calculate the power W of the engine 10. FIG. 7A to FIG. 7C illustrate the temporal change in the rotational speed (A), torque (B), and power (C) of the engine 10, respectively, in the rotational speed control processing.

First, the controller 20 determines the rotational speed of the engine 10 detected by the rotational speed sensor 17

(step S11). Upon determining that the rotational speed of the engine 10 is the first rotational speed N1 (step S11: Yes), the controller 20 executes the processes of steps S12 to S16. In the following, the processes of increasing the power of the engine 10 from a point-a0 to a point-c illustrated in FIG. 3 according to increase in the load of the hydraulic actuators will be described. The following three exemplary methods are the possible ones used for calculation of the power W of the engine 10.

In one of the exemplary methods, the power W of the engine 10 is expressed by the product of the rotational speed of the engine 10 and the torque. As illustrated in FIG. 6A, the torque of the engine 10 has a positive correlation (more specifically, proportional relation) with the amount of fuel injection by the injector 15. The relation illustrated in FIG. 6A is stored in advance in the memories. The controller 20 multiplies the rotational speed of the engine 10 detected by the rotational speed sensor 17 by the torque corresponding to the amount of fuel injection by the injector 15 being controlled by the engine controller 22, so as to calculate the power W of the engine 10.

In another one of the exemplary methods, the power W of the engine 10 is expressed by the product of the output of the hydraulic pump 12 and the pump efficiency of the hydraulic pump 12. Furthermore, the output of the hydraulic pump 12 is expressed by the product of the discharge pressure of the hydraulic pump 12 and the flow rate of the hydraulic oil discharged from the hydraulic pump 12. As illustrated in FIG. 6B, the flow rate of the hydraulic oil discharged from the hydraulic pump 12 has a positive correlation (more specifically, proportional relation) with the operation amount of the boom operation lever 7*a* (in other words, the pilot pressure detected by the pilot pressure sensor 7*c*). The relation illustrated in FIG. 6B is stored in advance in the memories. The controller 20 multiplies the discharge pressure detected by the discharge pressure sensor 19, the flow rate corresponding to the pilot pressure detected by the pilot pressure sensor 7*c*, and the pump efficiency set in advance, so as to calculate the power W of the engine 10.

In the other one of the exemplary methods, as illustrated in FIG. 60, the torque of the engine 10 has a positive correlation (more specifically, proportional relation) with the output of the hydraulic pump 12. Furthermore, the relation illustrated in FIG. 6B is stored in advance in the memories. The controller 20 multiplies the discharge pressure detected by the discharge pressure sensor 19 by the flow rate corresponding to the pilot pressure detected by the pilot pressure sensor 7*c*, so as to calculate the output of the hydraulic pump 12. Then, the controller 20 multiplies the rotational speed of the engine 10 detected by the rotational speed sensor 17 by the torque of the engine 10 corresponding to the output of the hydraulic pump 12, so as to calculate the power W of the engine 10.

The controller 20 compares the power W of the engine 10 with a predetermined increase threshold $W_{th1}$ (step S12). Until the power N of the engine 10 reaches the increase threshold $W_{th1}$ (step S12: No), the controller 20 outputs, to the regulator 18, a signal instructing increase in the discharge rate of the hydraulic pump 12 while keeping the rotational speed of the engine 10 at the first rotational speed N1. This enables, as during time-t0 to time-t1 in FIG. 7A to FIG. 7C, the torque and power of the engine 10 increase while the rotational speed of the engine 10 being kept at the first rotational speed.

The increase threshold $W_{th1}$ expresses the power of the engine 10 for raising the rotational speed of the engine 10 from the first rotational speed N1 to the second rotational speed N2. The increase threshold $W_{th1}$ is set to be less than the maximum power at the first rotational speed N1. That is, the controller 20 limits the upper limit value of the power of the engine 10 at the increase threshold $W_{th1}$ while the engine 10 is rotating at the first rotational speed N1.

Next, at time-t1 in FIG. 7C, upon increase in the power W of the engine 10 to the increase threshold $W_{th1}$ (step S12: Yes), the controller 20 raises the rotational speed of the engine 10 (step S13) and also outputs a signal instructing reduction in the discharge rate of the hydraulic pump 12 to the regulator 18 (step S14). The controller 20 repeats the processes of steps S13 to S14 until the rotational speed detected by the rotational speed sensor 17 reaches the second rotational speed N2 (step S15: No).

Here, the controller 20 sets the lower limit value of the power of the engine 10 to the first power value W1 while raising the rotational speed of the engine 10 from the first rotational speed N1 to the second rotational speed N2. The first power value W1 is the same value as that of the increase threshold $W_{th1}$. That is, in the process of raising the rotational speed of the engine 10 to the second rotational speed N2, the controller 20 outputs, to the regulator 18, a signal instructing reduction in the discharge rate of the hydraulic pump 12 so as to keep the power of the engine 10 constant.

In steps S13 to S14 to be repeatedly executed, for example, the controller 20 raises the rotational speed and reduces the discharge rate along the curved line N1. In other words, in the process of raising the rotational speed of the engine 10 to the second rotational speed N2, the controller 20 outputs, to the regulator 18, a signal instructing reduction in the discharge rate of the hydraulic pump 12 so as to make the power of the engine 10 match the first power value W1. This causes the torque to gradually decrease as the rotational speed increases so as to keep the power of the engine 10 at the first power value W1 as during the time-t1 to time-t2 illustrated by the solid line of FIG. 7G.

Next, once the rotational speed detected by the rotational speed sensor 17 has reached the second rotational speed N2 (step S15: Yes), the controller 20 outputs, to the regulator 18, a signal instructing increase in the discharge rate of the hydraulic pump 12 while keeping the rotational speed of the engine 10 at the second rotational speed N2 (step S16). This causes the torque to increase so as to make the power of the engine 10 have the second power value W2 as in the time-t2 and thereafter illustrated by the solid line of FIG. 7C while the rotational speed is kept at the second rotational speed N2.

The target power in step S16 varies depending on the request load by the engine 10, and is set to any value equal to or less than the second power value W2. The request load is a target value requested by the operator by means of the boom operation lever 7*a* (in other words, load corresponding to the operation amount of the boom operation lever 7*a*). That is, in step S16, the controller 20 outputs, to the regulator 18, a signal instructing adjustment of the discharge rate of the hydraulic pump 12 so as to make the power W of the engine 10 have a value corresponding to the request load with the second power value W2 as the upper limit.

On the other hand, upon determining that the rotational speed of the engine 10 is the second rotational speed N2 (step S11: No), the controller 20 executes the processes of steps S17 to S20. In the following, the processes of reducing the power of the engine 10 from the point-c to the point-a0 illustrated in FIG. 3 according to decrease in the load of the hydraulic actuators will be described.

The controller 20 compares the power N of the engine 10 with a predetermined decrease threshold $W_{th2}$ (step S17).

Until the power N of the engine 10 reaches the decrease threshold $W_{th2}$ (step S17: No), the controller 20 outputs, to the regulator 18, a signal instructing reduction of the discharge rate of the hydraulic pump 12 while keeping the rotational speed of the engine 10 at the second rotational speed N2.

Next, upon decrease in the power W of the engine 10 to the decrease threshold $W_{th2}$ (step S17: Yes), the controller 20 lowers the rotational speed of the engine 10 (step S18) and also outputs a signal instructing adjustment of the discharge rate of the hydraulic pump 12 to the regulator 18 (step S19). Then, the controller 20 repeats steps S18 to S19 until the rotational speed detected by the rotational speed sensor 17 reaches the first rotational speed N1 (step S20: No). More specifically, in steps S18 to S19 to be repeatedly executed, in the process of lowering the rotational speed of the engine 10 to the first rotational speed N1, the controller 20 outputs, to the regulator 18, a signal instructing adjustment of the discharge rate of the hydraulic pump 12 so as to make the power N of the engine 10 have a value corresponding to the request load. The change in the power N of the engine 10 in the process of decrease in the rotational speed of the engine 10 differs from the change in the power W of the engine 10 in the process of increase in the rotational speed of the engine 10 (that is, the curved line N1 of FIG. 4).

The decrease threshold $W_{th2}$ expresses the power of the engine 10 for lowering the rotational speed of the engine 10 from the second rotational speed N2 to the first rotational speed N1. The decrease threshold $W_{th2}$ is set less than the first power value N1. That is, the controller 20 limits the power of the engine 10 from the second power value W2 (upper limit value) to the decrease threshold $W_{th2}$ (lower limit value) while the engine 10 is rotating at the second rotational speed N2.

Figure 8:
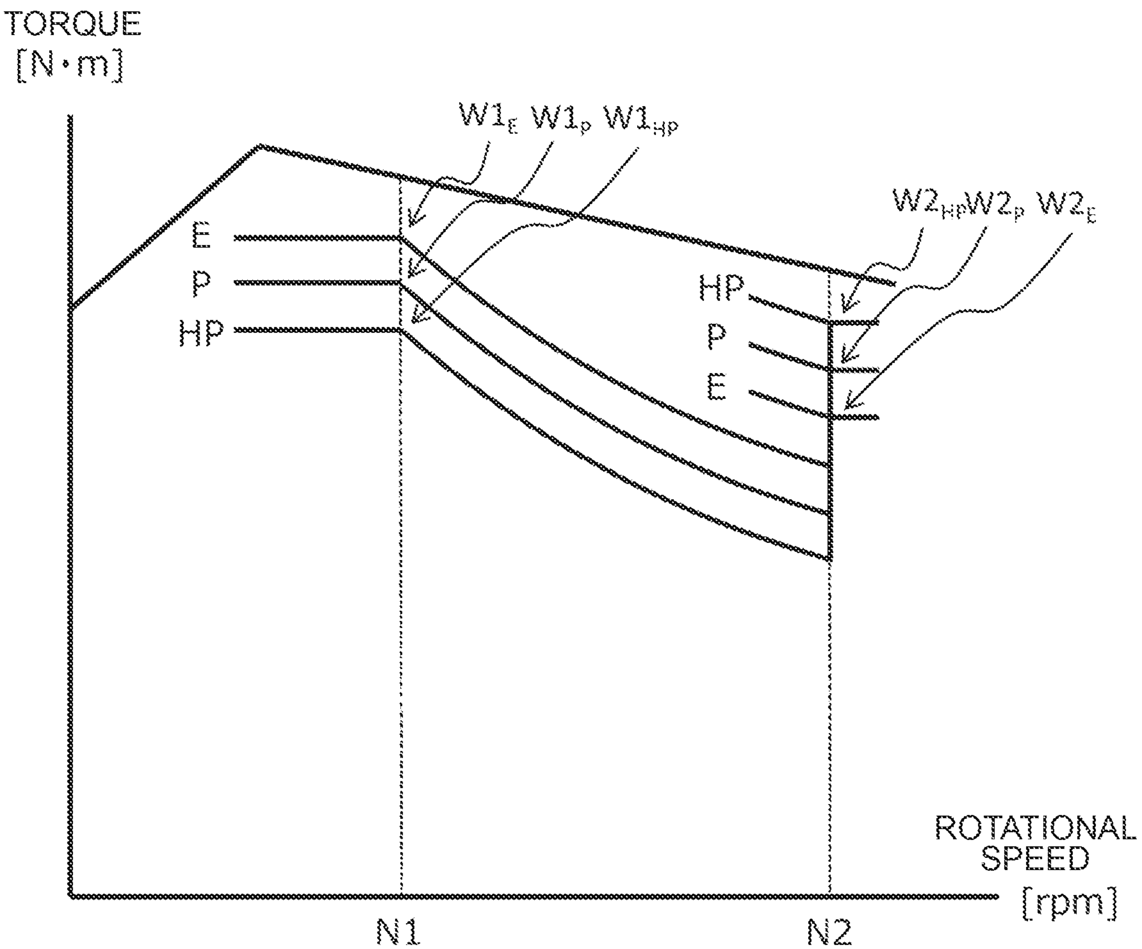
FIG. 8 illustrates a relation between curved lines W1, W2 corresponding to a plurality of operation modes of a hydraulic excavator, respectively.

Note that the rotational speed control processing described above is commonly applied to the eco mode, the power mode, and the high-power mode. That is, the processing described above is performed with the operation mode of the hydraulic excavator 1 being fixed. On the other hand, the first power value W1 and the second power value W2 are different among the eco mode, power mode, and high-power mode. FIG. 8 illustrates relations between curved lines W1, W2 corresponding to a plurality of operation modes of the hydraulic excavator 1, respectively.

As illustrated in FIG. 8, the first power value W1 is set to a higher value in the order of the eco mode, the power mode, and the high-power mode ($W1_E > W1_P > W1_{HP}$). In accordance therewith, the increase threshold $W_{th1}$ is also set to a higher value in the order of the eco mode, the power mode, and the high-power mode. On the other hand, the second power value W2 is set to be lower in the order of the eco mode, the power mode, and the high-power mode ($W2_E < W2_P < W2_{HP}$). However, the second power value W2 may be set to the same value among the eco mode, the power mode, and the high-power mode.

According to the embodiment described above, keeping the rotational speed of the engine 10 at the first rotational speed N1 while the load of the hydraulic actuators is low enables the hydraulic excavator 1 to work with low fuel consumption. Upon increase in the load of the hydraulic actuators, raising the rotational speed of the engine 10 from the first rotational speed N1 to the second rotational speed N2 enables the power of the engine 10 to increase for the load of the hydraulic actuators.

Here, in the process of raising the rotational speed of the engine 10 to the second rotational speed N2, reducing the discharge rate of the hydraulic pump 12 (in other words, torque of the engine 10) enables the rotational speed of the engine 10 to quickly reach the second rotational speed N2. This can reduce a period of time in which the extension and contraction speed of the boom cylinder 4*d* does not follow the operation amount of the boom operation lever 7*a*. Furthermore, in the process of raising the rotational speed of the engine 10 to the second rotational speed N2, setting the power of the engine 10 to be equal to or higher than the first power W1 can prevent workability from being significantly lowered. As a result, it is possible to achieve both low fuel consumption and ensuring of workability.

Note that an object to be compared with the increase threshold $W_{th1}$ in step S11 is not limited to the power of the engine 10, and may be the output of the hydraulic pump 12. The same applies to an object to be compared with the decrease threshold $W_{th2}$ in step S17. Furthermore, in step S14, the controller 20 may reduce the discharge rate of the hydraulic pump 12 such that the output of the hydraulic pump 12 matches the first output value. The output of the hydraulic pump 12 can be calculated by the method which has described with reference to FIG. 6B.

Furthermore, in the process of raising the rotational speed of the engine 10 to the second rotational speed N2, the power of the engine 10 may not necessarily match the first power value N1. For example, in steps S13 to S14 to be repeatedly executed, the controller 20 may raise the rotational speed and lower the discharge volume along the curved line W1' illustrated in FIG. 3. In other words, in the process of raising the rotational speed of the engine 10 to the second rotational speed N2, the controller 20 outputs, to the regulator 18, a signal instructing reduction of the discharge rate of the hydraulic pump 12 so that the power of the engine 10 becomes higher as the rotational speed of the engine 10 becomes higher.

This causes the torque to gradually decrease as the rotational speed of the engine 10 increases such that the power of the engine 10 gradually increases as during time-t1 to time-t3 indicated by the dashed line in FIG. 7C. The torque indicated by the broken line in FIG. 7B decreases gradually more than the torque indicated by the solid line. On the other hand, in FIG. 7A, regarding a period of time in which the rotational speed of the engine 10 reaches the second rotational speed N2 from the first rotational speed N1, the period of time indicated by the broken line (t1 to t3) is longer than the one indicated by the solid line (t1 to t2).

That is, under the control along the broken lines in FIG. 7A to FIG. 7C, as compared with the control along the solid lines in FIG. 7A to FIG. 7C, a period of time in which the speed of extension and contraction of the boom cylinder 4*d* does not follow the operation amount of the boom operation lever 7*a* becomes longer, however, reduction in workability until the rotational speed of the engine 10 reaches the second rotational speed N2 can be suppressed.

Still further, according to the embodiment described above, the increase threshold $W_{th1}$ is set to the same value as the first power value W1, and the decrease threshold $W_{th2}$ is set to a value less than the first power value W1. This can prevent the rotational speed of the engine 10 from being repeatedly switched (so-called, hunting) due to the fluctuation of the rotational speed of the engine 10 detected by the rotational speed sensor 17.

Still further, according to the embodiment described above, the first power value W1, the second power value W2, and the increase threshold $W_{th1}$ in the eco mode, the power mode, and the high-power mode are set to have the relations in terms of magnitude as described with reference to FIG. 8. This causes the rotational speed of the engine 10 to be easily kept at the first rotational speed N1 in the eco mode, which enables the hydraulic excavator 1 to work with low fuel consumption. On the other hand, in the high-power mode, the rotational speed of the engine 10 is easily switched to the second rotational speed N2, which enables the high load of the hydraulic actuators to be responded.

The exemplary embodiments described above are provided to explain the present invention, and the scope of the present invention is not limited only to those embodiments. Those skilled in the art can implement the invention in various other ways without departing from the concept of the invention.

REFERENCE SIGNS LIST

1 hydraulic excavator
2 undercarriage
3 upperstructure
4 front working device
4*a* boom
4*b* arm
4*c* bucket
4*d* boom cylinder
4*e* arm cylinder
4*f* bucket cylinder
5 swing frame
6 counterweight
7 cab
7*a* boom operation lever
7*b* mode selection switch
7*c* pilot pressure sensor
8 crawler
10 engine
11 hydraulic oil tank
12 hydraulic pump
13 pilot pump
14 directional control valve
15 injector
16 output shaft
17 rotational speed sensor
18 regulator
19 discharge pressure sensor
20 controller
21 vehicle body controller
22 engine controller

The invention claimed is:

1. A work machine comprising:

an engine;

a variable displacement hydraulic pump that discharges a hydraulic oil by using a driving force of the engine;

a regulator that varies a discharge rate of the hydraulic pump;

a hydraulic actuator that works by using the hydraulic oil discharged from the hydraulic pump;

a rotational speed sensor that detects a rotational speed of the engine; and a controller that controls the rotational speed of the engine and the discharge rate of the hydraulic pump, wherein the controller is configured to:

in a state where an power of the engine or an output of the hydraulic pump has increased to an increase threshold with the rotational speed detected by the rotational speed sensor being at a first rotational speed, raise the rotational speed of the engine from the first rotational speed to a second rotational speed that is higher than the first rotational speed;

in a process of raising the rotational speed of the engine to the second rotational speed, output, to the regulator, a signal instructing reduction in the discharge rate of the hydraulic pump so as to keep the power of the engine or the output of the hydraulic pump constant; and after the rotational speed detected by the rotational speed sensor has reached the second rotational speed, output, to the regulator, a signal instructing increase in the discharge rate of the hydraulic pump so as to make the power of the engine or the output of the hydraulic pump have a value corresponding to a request load.

2. The work machine according to claim 1, wherein in a process of raising the rotational speed of the engine to the second rotational speed, the controller outputs, to the regulator, a signal instructing reduction in the discharge rate of the hydraulic pump so as to make the power of the engine or the output of the hydraulic pump match the increase threshold.

3. The work machine according to claim 1, wherein in a state where the power of the engine or the output of the hydraulic pump has decreased to a decrease threshold with the rotational speed detected by the rotational speed sensor being at the second rotational speed, the controller lowers the rotational speed of the engine from the second rotational speed to the first rotational speed; and in a process of lowering the rotational speed of the engine to the first rotational speed, the controller outputs, to the regulator, a signal instructing adjustment of the discharge rate of the hydraulic pump so as to make the power of the engine or the output of the hydraulic pump have a value corresponding to a request load.

* * * * *